(12) United States Patent
Schoppmeier et al.

(10) Patent No.: US 7,972,457 B2
(45) Date of Patent: Jul. 5, 2011

(54) DEVICE AND METHOD FOR DRAPING AND PRE-SHAPING CURVED PROFILED STRUCTURAL COMPONENTS OF FIBER MATERIALS

(75) Inventors: Jan Schoppmeier, Wennigsen (DE); Rolf Sundermann, Buxtehude (DE); Holger Purol, Selsingen (DE); Axel Herrmann, Stade (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 12/575,747

(22) Filed: Oct. 8, 2009

(65) Prior Publication Data

US 2010/0252179 A1 Oct. 7, 2010

Related U.S. Application Data

(60) Provisional application No. 61/104,053, filed on Oct. 9, 2008.

(30) Foreign Application Priority Data

Oct. 9, 2008 (DE) .......................... 10 2008 051 121

(51) Int. Cl.
*B29C 70/32* (2006.01)
(52) U.S. Cl. ........ 156/173; 156/184; 156/189; 156/250; 156/443; 156/446; 156/461; 156/463; 156/510
(58) Field of Classification Search .......... 156/184–195, 156/201–202, 443, 446, 461, 463
See application file for complete search history.

(56) References Cited

U.S. PATENT DOCUMENTS

| | | | | |
|---|---|---|---|---|
| 2,175,399 A * | 10/1939 | Judd | ......................... | 192/107 M |
| 2,504,144 A * | 4/1950 | Morris | ......................... | 138/174 |
| 2,723,705 A | 11/1955 | Collins | | |
| 3,391,713 A * | 7/1968 | Reinman | ......................... | 138/144 |
| 3,645,829 A * | 2/1972 | Palfreyman et al. | ........... | 156/441 |
| 5,043,128 A * | 8/1991 | Umeda | ......................... | 264/258 |
| 2005/0056362 A1 * | 3/2005 | Benson et al. | ................. | 156/163 |
| 2008/0099131 A1 * | 5/2008 | Umeda et al. | .................. | 156/201 |

FOREIGN PATENT DOCUMENTS

DE 2155879 5/1973
WO 2006021711 3/2006

\* cited by examiner

*Primary Examiner* — Sam C Yao
(74) *Attorney, Agent, or Firm* — Wood, Herron & Evans, LLP

(57) ABSTRACT

A device for draping and pre-shaping curved profiled structural components of fiber materials includes at least one shaping tool having a curved shaping face which has a profiled cross-section and which defines the outer contour of the profiled structural component. The device also includes a plurality of unwinding devices each for discharging a web-like fiber material, a device for performing a relative movement between the shaping tool and the plurality of unwinding devices for tangentially winding the web-like fiber materials onto the curved shaping face under tension, and a fixing device for finally fixing the shape of all of the web-like fiber materials wound on the curved shaping face. A method of draping and pre-shaping curved profiled structural components of fiber materials is also disclosed.

13 Claims, 3 Drawing Sheets

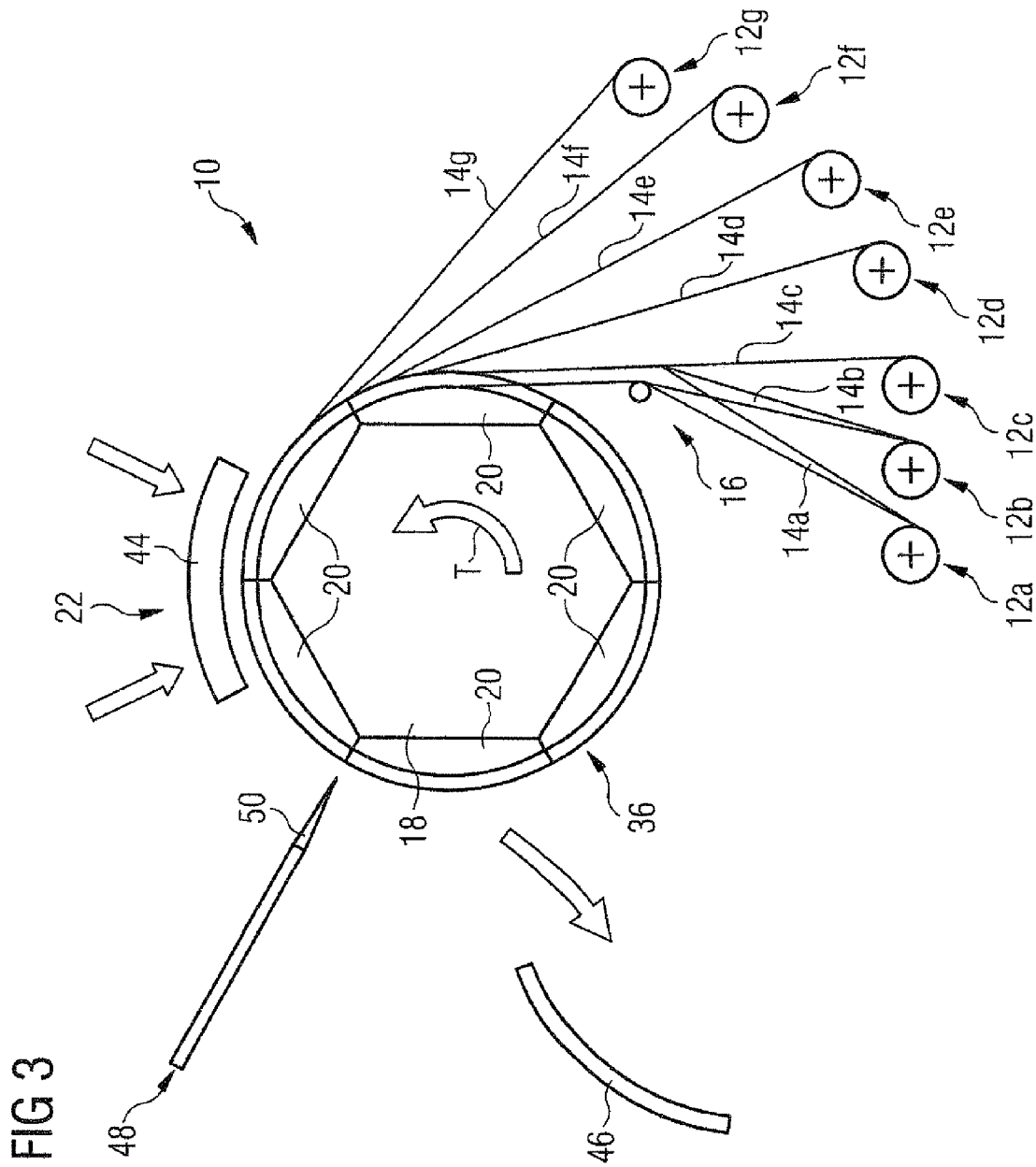

DEVICE AND METHOD FOR DRAPING AND PRE-SHAPING CURVED PROFILED STRUCTURAL COMPONENTS OF FIBER MATERIALS

This application claims priority to U.S. Provisional Patent Application No. 61/104,053, filed on Oct. 9, 2008; and/or German Patent Application No. 102008051121.8, filed on Oct. 9, 2008.

TECHNICAL FIELD

The invention relates to a device and a method for draping and pre-shaping curved profiled structural components of fiber materials. The term "profiled structural components" in the context of the present invention is intended to refer to components which provide structure and which ensure the structural strength of a body, that is to say, components which form the supporting structure of a body, such as, for example, an aircraft fuselage.

BACKGROUND

In particular in the field of aircraft construction, the applicability of profiled structural components comprising fiber materials has for some time been increasingly examined, the term fiber materials being intended to refer to fabrics or non-wovens which are reinforced with glass fibers or carbon fibers, for example, in the form of mats or webs. In order to form a profiled structural component from composite fiber material, the fibers must first be pre-produced and aligned in accordance with their required orientation. The pre-produced fabrics or non-wovens must then be positioned in layers in the desired form, that is to say, draped. In particular with curved profiled structures, this draping process is difficult and correspondingly complex. The fiber materials, in order to achieve curved geometries, must be laid in curves owing to the length differences between the outer edge and the inner edge, which may lead to an undesirable formation of creases. An additional difficulty involves retaining the desired fiber orientation on the shaping tool.

After the draping, the multi-layer laminate structure which is obtained must be fixed. This is generally carried out in a so-called pre-forming step in which the laminate structure, which is sprayed with a bonding material which generally develops its fixing action with the application of heat, is heated in order to set the binding material. Alternatively, it is possible to use fabrics or non-wovens which are already impregnated with a bonding material, so-called prepregs.

An application example for future profiled structural components comprising composite fiber material relates to frames or ribs as used in an aircraft fuselage and in aircraft wings. Previously, such ribs produced from fiber materials had to be individually manufactured using time consuming manual labor, with the individual web layers being draped on a corresponding shaping tool, being temporarily fixed at that location, and then being baked to form a preform with the application of heat. If ribs made of fiber materials are to be used in future for the mass production of aircraft, such a manufacturing operation is too slow and too uneconomical.

SUMMARY

The object of the invention is to provide assistance in this regard and to provide a device and a method for draping and pre-shaping curved profiled structural components of fiber materials by means of which it is possible in a quicker and more cost-effective manner to produce a large number of such profiled structural components with a quality level which can be reproduced.

This object is achieved according to the invention with a device or method having the features set out below.

Hence, the device according to the invention has at least one shaping tool having a curved shaping face which has a profiled cross-section and which defines the outer contour of the profiled structural component, and further a plurality of unwinding devices each for discharging a web-like fiber material, a device for performing a relative movement between the shaping tool and the plurality of unwinding devices for tangentially winding the web-like fiber materials onto the curved shaping face under tension, and a fixing device for finally fixing the shape of all of the web-like fiber materials wound on the curved shaping face.

The web-like fiber materials are pre-produced fabrics or non-wovens which may also be so-called prepregs, and are advantageously stored on reels in "continuous" form. Each unwinding device holds such a reel and transfers the web-like fiber material to preferably at least one supply device for guiding the web-like fiber material onto the curved shaping face. The supply device may comprise, for example, one or more roller pairs which together move the web-like fiber material forward and guide it laterally. The supply device may further comprise positioning rollers which move the edge of the web-like fiber material into a desired position. In preferred configurations of the device according to the invention, the supply device further has at least one profiling roller which is arranged between an unwinding device and the shaping tool in order to shape the web-like fiber material similarly to the profiled shape of the shaping tool. A separate supply device may be associated with each unwinding device, in particular when the initially planar form of the web-like fiber material is intended to be changed into a desired three-dimensional shape, for example, an L-shape or Z-shape. Finally, the supply device preferably comprises means for attaching the beginning of the web-like fiber materials to a shaping tool or a shaping tool carrier. In this manner, it is ensured that the web-like fiber material can be fitted to the shaping face under tension. If no supply device is used, the or each unwinding unit may contain a brake in order to allow the web-like fiber material to be unwound under tension.

The relative movement between the shaping tool and the plurality of unwinding devices may be a rotational movement and/or a transverse movement, depending on the structure of the profiled structural component to be produced. In the case of very large profiled structural components, it may be advantageous to move the plurality of unwinding devices relative to the shaping tool. However, it is generally more simple if the device for performing that relative movement moves the shaping tool. To this end, the shaping tool can be retained on a shaping tool carrier which is moved by the device for performing a relative movement, for example, rotated or pivoted. Such a shaping tool carrier may carry a plurality of shaping tools which may be arranged adjacent to each other or one after the other. For the efficient production of ribs, for example, for an aircraft fuselage, it is found to be advantageous to have a circular shaping tool carrier, on which a plurality of shaping tools are arranged successively in a peripheral direction. The radius of such a shaping tool carrier substantially corresponds to the radius of the subsequent aircraft fuselage. By way of a continuous rotation of such a shaping tool carrier, the individual fiber material layers can be easily fitted to the shaping faces of the shaping tools and preforms can be continuously produced.

In another configuration, only one shaping tool is used and is retained on a shaping tool carrier which is mounted on a rocker. Using the rocker, the shaping tool carrier can be pivoted relative to the unwinding devices, the individual layers of the pre-produced web-like fiber materials being draped onto the shaping face during the pivoting movement.

The shaping tool may advantageously be constructed in such a manner that it is possible to produce two mirror-inverted profiled structural components therewith. After draping and fixing the laminate structure, it can be divided into two halves by cutting in the longitudinal direction, of which each half constitutes a preform of a desired profiled structural component. Such a configuration of the device can also be readily combined with the circular shaping tool carrier described above.

The fixing device is preferably a heating device for baking the fiber material layers which are draped one on top of the other. This heating device can transfer the necessary heat supply by means of direct contact with the laminate structure or by means of heat radiation. Depending on the material used as a binding resin, the "heating device" may also emit UV radiation, which allows the binding resin to set. Inductive heating devices or heating devices which emit microwave energy may also be considered. In each case, the individual layers of the fiber material which are draped on top of each other are intimately and permanently connected to each other by the supply of heat and/or radiation.

In particular when a plurality of preforms of desired profiled structural components are produced at the same time using the device according to the invention, a separation device for cutting the baked fiber material layers which have been draped on top of each other into individual preforms may be arranged downstream of the fixing device. The device according to the invention then discharges completed preforms, which only need to be subjected to a finishing operation.

The method according to the invention comprises the steps of:
- tangentially conveying prefabricated, web-like fiber material layers to a curved shaping face which has a profiled cross-section and which defines the outer contour of the profiled structural component,
- winding the fiber material layers onto the shaping face under tension by means of rotation and/or transverse movement of the shaping face, and
- fixing the shape of the entirety of the web-like fiber materials wound onto the curved shaping face. Between the step of the tangential conveying and the step of winding the fiber material layers, there is carried out a profiling step in which at least one fiber material layer to be wound is shaped similarly to the profile of the shaping face before the fiber material layer reaches the shaping face.

The fixing of the entirety of the web-like fiber materials wound on the curved shaping face is preferably carried out by baking the laminate structure, that is to say, by setting, brought about with heat or by other means, of a binding resin which connects the individual fiber material layers intimately and permanently to each other. The setting may be carried out by application of heat or other radiation, for example, UV radiation.

In preferred configurations of the method according to the invention, the fixing step is followed by a step of cutting the fixed fiber material layers which are draped on top of each other into individual preforms.

BRIEF DESCRIPTION OF THE DRAWINGS

An embodiment of the invention will be explained below in greater detail with reference to the appended schematic drawings, in which:

FIG. 3 is a plan view of a device of FIG. 1 having a plurality of unwinding devices and a sever device.

DETAILED DESCRIPTION

Figure 1:
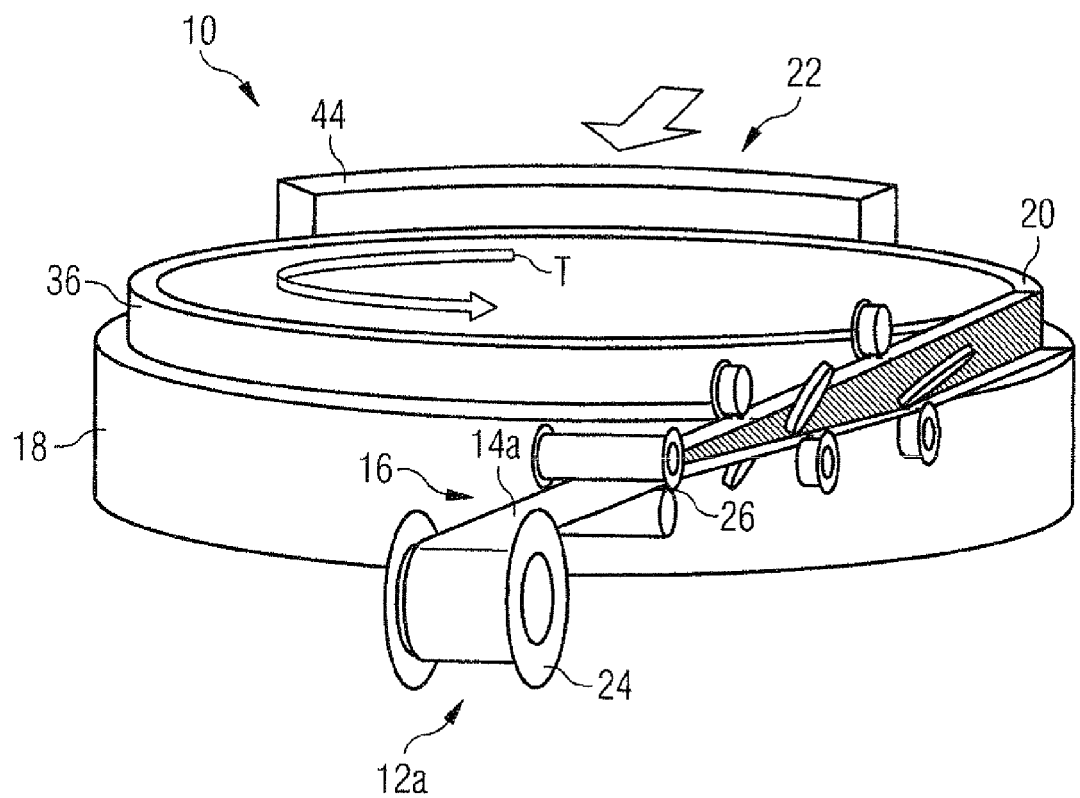
FIG. 1 is a perspective illustration of an embodiment of a device according to the invention for draping and pre-shaping curved profiled structural components of fiber materials.
Figure 2:
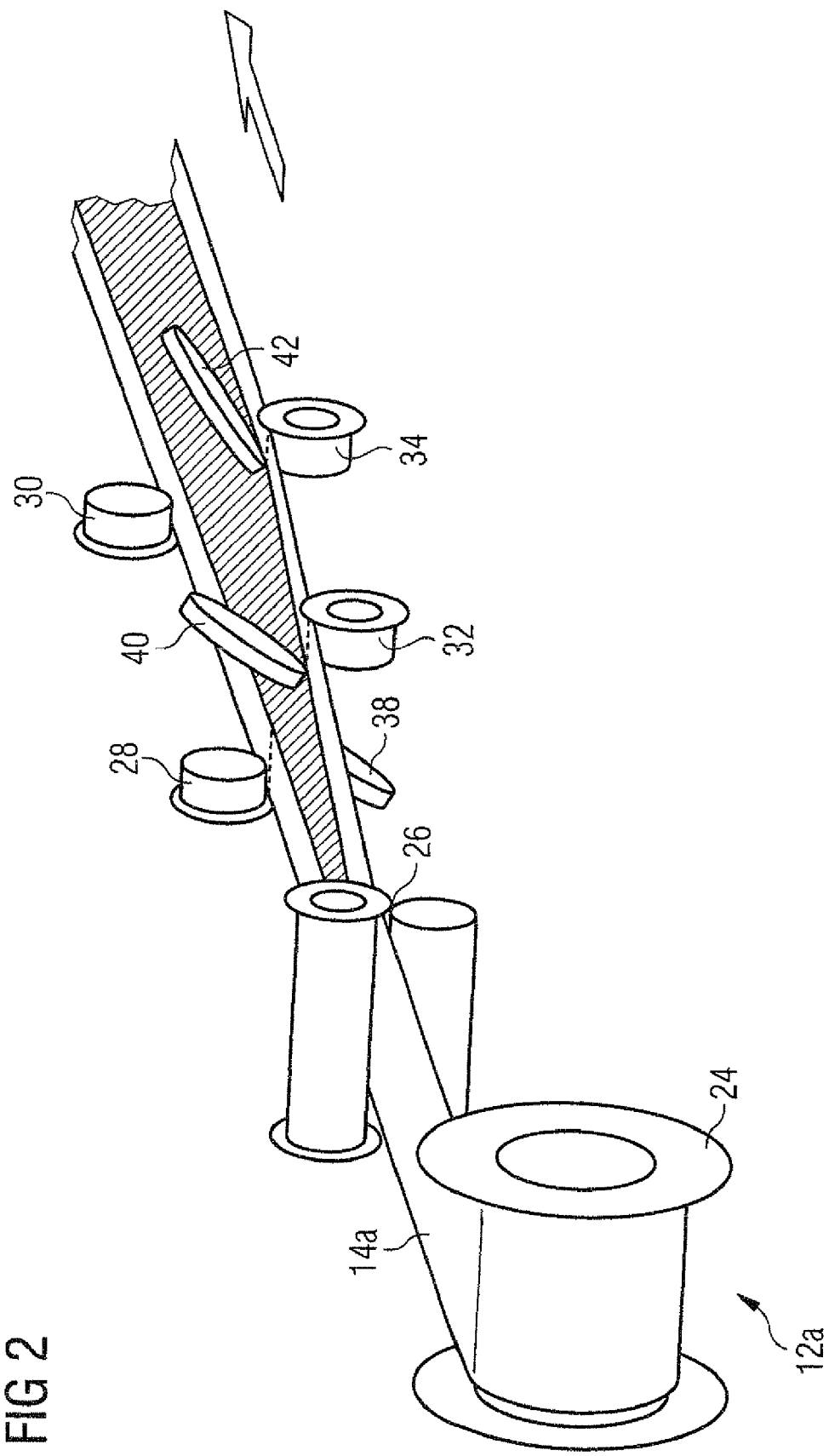
FIG. 2 is an unwinding device and supply device of the device set out in FIG. 1, drawn to a larger scale.

FIG. 1 is a schematic illustration of a device generally designated 10 for draping and pre-shaping curved profiled structural components of fiber materials. The device 10 comprises, as main components, a plurality of unwinding devices, of which only one unwinding device 12a is illustrated in FIG. 1 for clarity, and each of which discharges a layer of a web-like fiber material (in this instance 14a) and co-operates with an associated supply device 16, and additionally a shaping tool carrier 18, on which a plurality of shaping tools 20 (see FIG. 3) are retained, and finally a fixing device 22.

Each unwinding device 12a-12g is constructed for rotatably retaining a reel or coil 24, on which a long web of a prefabricated fiber material 14a-14g is wound-up. By unwinding the web-like fiber material 14a from the coil 24, a layer of the fiber material 14a can be provided substantially continuously during operation of the device 10.

The web-like fiber material 14a which is unwound from the coil 24 first passes a roller pair 26 associated with the supply device 16, and then comes into contact with both edges thereof with a plurality of positioning rollers 28, 30, 32 and 34 which are arranged at the left-hand side and at the right-hand side of the web-like fiber material 14a and which ensure correct alignment of the supplied fiber material 14a with respect to a shaping face 36 of the shaping tool(s) 20 on which the fiber material 14a is to be draped. The shaping face 36 which determines the outer contour of the profiled structural component to be shaped is curved and has a profiled cross-section which is Z-like in this instance. In the embodiment illustrated, each shaping face 36 defines a rib for an aircraft fuselage.

In addition to the roller pair 26 and the positioning rollers 28 to 34, the supply device 16 further comprises in the example illustrated three profiling rollers 38, 40 and 42 which, together with the positioning rollers 28 to 34, shape the web of fiber material 14a which is planar at first into a profile substantially corresponding to the profile of the shaping face 36 so that the web-like fiber material 14a can be positioned in the most precise and crease-free manner possible onto the shaping face 36. In this instance, the profiling rollers 38 to 42 force the web-like fiber material 14a into a Z-shape. To this end, the profiling roller 38 is arranged as illustrated on the rear side of the fiber material 14a and ensures the forming of the first fold of the Z-shape. The profiling roller 40 is located approximately opposite the profiling roller 38 at the front side of the fiber material 14a and ensures the forming of the second fold of the Z-shape. The other profiling roller 42 is arranged slightly downstream in the movement direction of the fiber material and, together with a profiling roller at the rear side of the fiber material (not visible in this instance), forms the two folds even more favorably so that the web-like fiber material 14a which is guided by the supply device 16 tangentially relative to the shaping face 36, can be positioned in the most precise manner possible on the shaping face 36.

The circular shaping tool carrier 18 which in this instance supports six shaping tools 20 (see FIG. 3) is mounted so as to rotate about the center axis thereof and is rotated during operation in the direction of an arrow T by a drive which is not illustrated in this instance, in order to wind the individual, in this instance seven, web-like fiber material layers 14*a*-14*g* on the shaping faces 36 of the shaping tools 20 (See FIG. 3).

The laminate structure which is produced in this manner from the seven fiber material layers in this instance is baked using the fixing device 22, that is to say, intimately connected together and set. To this end, the fixing device 22 has a heatable shaping piece 44 which, by means of heat application, sets a binding resin which is contained in the fiber material 14*a*-14*g* or which is supplied thereto upstream of the fixing device 22.

In order to form individual preforms 46, a separation device 48 is arranged downstream of the fixing device 22 in FIG. 3 and, by means of a radially acting cutting blade 50, severs the baked laminate structure between the individual shaping tools 20 so that individual rib-like preforms 46 become separated from the shaping tools 20, which preforms subsequently need only be subjected to a finishing operation.

The invention claimed is:

1. Device for draping and pre-shaping curved structural components of fiber material, comprising
   at least one shaping tool with a curved shaping face which defines the outer contour of the structural component, the curved shaping face being oriented vertically,
   a plurality of unwinding devices each for discharging a web-like fiber material,
   a device for performing a relative movement between the shaping tool and the plurality of unwinding devices for tangentially winding the web-like fiber materials onto the vertically oriented curved shaping face under tension, and
   a fixing device for finally fixing the shape of all of the web-like fiber materials wound on the curved shaping face,
   wherein the structural component is a profiled structural component,
   at least one supply device for guiding the web-like fiber materials onto the curved shaping face is provided,
   the shaping face has a profiled cross-section,
   the supply device has at least one profiling roller which is disposed upstream from the shaping tool and between an unwinding device and the shaping tool in order to shape a web-like fiber material similarly to the profile shape of the shaping tool.

2. Device according to claim 1, wherein the device for carrying out a relative movement moves the shaping tool.

3. Device according to claim 2, wherein the shaping tool is retained on a shaping tool carrier which is moved by the device for performing a relative movement.

4. Device according to claim 3, wherein the shaping tool carrier supports a plurality of shaping tools.

5. Device according to claim 4, wherein the shaping tool carrier is circular and in that the plurality of shaping tools on the shaping tool carrier are arranged successively in a peripheral direction.

6. Device according to claim 5, wherein the curved profiled structural components are ribs for an aircraft fuselage and in that the radius of the shaping tool carrier substantially corresponds to the radius of the aircraft fuselage.

7. Device according to claim 1, wherein the supply device comprises means for attaching the beginning of the web-like fiber materials to a shaping tool or a shaping tool carrier.

8. Device according to claim 1, wherein the fixing device is a heating device for baking the fiber material layers draped on top of each other.

9. Device according to claim 1, wherein a separation device for cutting the baked fiber material layers draped on top of each other into individual preforms is arranged downstream of the fixing device.

10. Device according to claim 1, wherein the device for performing a relative movement carries out a rotational and/or a transverse movement.

11. A method for draping and pre-shaping curved profiled structural components of fiber materials, comprising the steps of:
    tangentially conveying pre-produced, web-like fiber material layers to a curved shaping face which has a profiled cross-section and which defines the outer contour of the profiled structural component, the curved shaping face being oriented vertically,
    winding the fiber material layers onto the shaping face under tension by means of rotation and/or transverse movement of the shaping face, and
    fixing the shape of all of the web-like fiber materials wound on the vertically oriented curved shaping face, wherein between the tangential conveying and the winding of the fiber material layers, there is carried out a profiling step upstream of the curved shaping face in which at least one fiber material layer to be wound is shaped similarly to the profile of the shaping face.

12. Method according to claim 11, wherein the step of fixing is carried out by baking the fiber material layers draped on top of each other.

13. Method according to claim 11, wherein the fiber material layers draped on top of each other are cut into performs.

* * * * *